United States Patent [19]
Coburn et al.

[11] 3,831,236
[45] Aug. 27, 1974

[54] CUP-SHAPED CUTTING TOOL HAVING CUTTING TEETH

[75] Inventors: Orin W. Coburn; Joe D. Stith, both of Muskogee, Okla.

[73] Assignee: Coburn Optical Industries, Inc., Muskogee, Okla.

[22] Filed: Jan. 7, 1972

[21] Appl. No.: 216,166

[52] U.S. Cl............. 29/103 R, 29/105 A, 29/95 D
[51] Int. Cl..................... B26d 1/12, B26d 1/00
[58] Field of Search.......... 29/95, 95 C, 103, 103 A, 29/105, 105 A; 144/241, 218

[56] References Cited
UNITED STATES PATENTS

| | | | |
|---|---|---|---|
| 299,153 | 5/1884 | McCourt | 144/241 |
| 1,313,034 | 8/1919 | Williams | 29/105 A |
| 2,256,847 | 9/1941 | Osenberg | 29/103 A |
| 2,301,655 | 11/1942 | Axel | 29/105 A |
| 2,430,844 | 11/1947 | Colwell | 29/105 A |
| 2,638,021 | 5/1953 | Van Der Heiden | 29/95 R |
| 2,814,854 | 12/1957 | Murray | 29/105 A |
| 3,203,072 | 8/1965 | Careje | 29/105 A |
| 3,351,998 | 11/1967 | Theiler | 29/105 R |
| 3,435,513 | 4/1969 | Knittweis | 29/103 R |
| 3,553,905 | 1/1971 | Lemelson | 29/103 R |

FOREIGN PATENTS OR APPLICATIONS

| | | | |
|---|---|---|---|
| 1,348,808 | 12/1963 | France | 29/105 A |
| 703,927 | 2/1931 | France | 29/105 A |

*Primary Examiner*—Harrison L. Hinson
*Attorney, Agent, or Firm*—John J. Byrne; Edward E. Dyson

[57] ABSTRACT

A cup-shaped tool for generating lens surfaces on a plastic lens blank wherein said tool has a plurality of spaced teeth along the cutting surface thereof.

8 Claims, 6 Drawing Figures

PATENTED AUG 27 1974 3,831,236

CUP-SHAPED CUTTING TOOL HAVING CUTTING TEETH

In conventional methods of generating prescriptive surfaces on a lens blank, a cup-shaped abrading tool traverses the lens surface along a pre-selected path with the tool set at a pre-selected angle whereby the desired base and cross curves are formed. With the advent of plastic lens, the prior art methods have not changed materially. However, the heat generated by grinding often distorts plastic with a resulting loss of the lens blank. Such heat presents only a minor problem in the generation of surfaces on a glass blank. Therefore, a pricipal objective of this invention is to provide a means and methods of generating prescriptive curves on a plastic lens blank in a manner to reduce the aforementioned heat effects.

With conventional methods, for either plastic or glass blanks, it is often necessary to make several sweeps across a lens blank with the abrading tool in order to reduce the lens blank to the proper thickness. In each of these sweeps, especially when using plastic lens, damage to the lens may occur. Another principal objective of this invention is to provide means and methods whereby the prescriptive lens surface can be formed with a single cutting pass or sweep.

Another objective of this invention is to provide a cup-shaped instrument or tool which "cuts" a plastic lens blank during the formation of the prescriptive lens surface. Such cutting (as opposed to grinding) is accomplished by utilizing a plurality of teeth instead of a conventional abrading diamond surface.

It has been found in actual practice that utilizing cutting teeth of the type described herein sometimes develops an objectionable high pitched noise. Another objective of this invention is to reduce these objectionable harmonics by staggering the cutting teeth at preselected distances. In order to properly balance an abrading tool having staggered teeth, this invention provides counter-balance weights to compensate for the weight loss of a removed tooth.

A further objective of this invention is to provide a one-sweep cutting tool that transmits less stress to a plastic lens than conventional grinding abrading surfaces and which provides means for smoothly and efficiently forming the prescriptive surfaces.

These and other objects of the invention will become more apparent to those skilled in the art by reference to the following detailed descriptions when viewed in light of the accompanying drawings in which.

Figure 1:
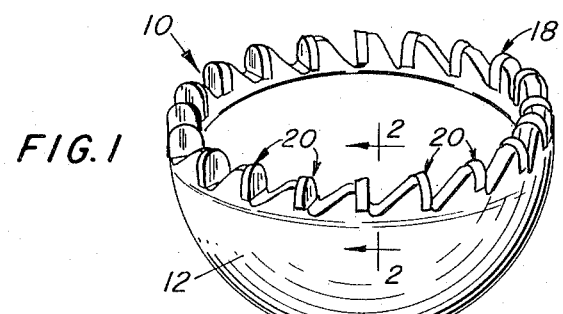
FIG. 1 is an isometric view of the tool of this invention.

Referring now to the drawings wherein like numerals indicate like parts, the numeral 10 indicates the tool of this invention. The tool is comprised of two basic parts, a cup shaped portion 12 and a shank portion 14. The shank 14 is mounted to a lens generating machine, not shown, and as is conventional in the art, is caused to traverse a path across a lens blank to form or shape the base and cross curves of the prescription. The shank 14 is utilized to secure the tool to the drive shaft of such apparatus. The tool 10 is rotated and caused to traverse the required path. (See U.S. Pat. No. 3,289,355 issued Dec. 6, 1966). When utilizing diamondtype abrading surfaces it is not unusual that several sweeps of the tool across the face of the lens is necessary for finishing.

The cutting rim of the tool of this invention is generally indicated by the numeral 18. This rim 18 of the cup-shaped portion 12 includes a plurality of cutting teeth 20. Each cutting edge itself is indicated at 28 and is formed where the leading surfaces 22 and trailing surfaces 24 intersect.

The teeth can be carbide or diamond alloy inserts 30. Utilizing such inserts gives the tool increased life by mere replacement of new cutting teeth when the originals become dull. The inserts can be secured in position by braising, welding and/or other known methods.

Figure 2:
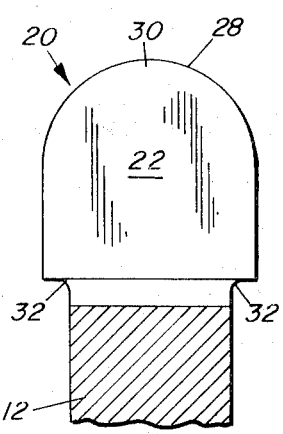
FIG. 2 is a section along the line 2—2 of FIGURE 1.
Figure 3:
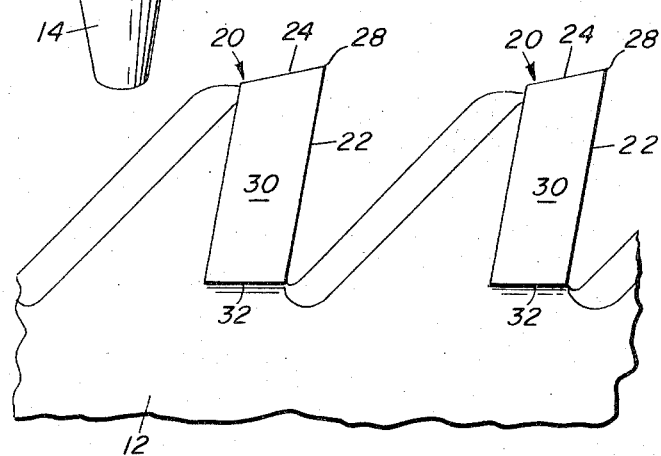
FIG. 3 is an enlarged, partial side view of the tool of FIG. 1.
Figure 4:
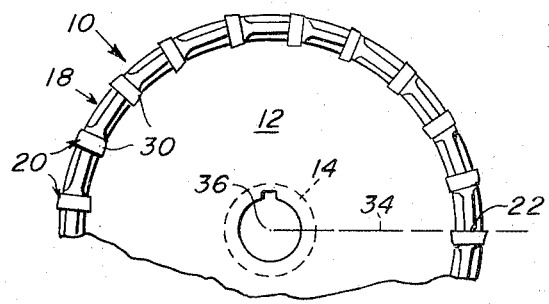
FIG. 4 is a top plan of the tool of FIG. 1.

As seen best in FIG. 2, the cup 12 is slightly undercut at 32 with respect to the cutting teeth. The plane 34 of lead surface 22 intersects, or approximately intersects, the axis of rotation 36. Also note in FIG. 3 the slight forward "rake" angle of the leading surface 22.

The tool can be shaped in accordance with the above description and subsequently be diamond-plated by known methods.

Figure 5:
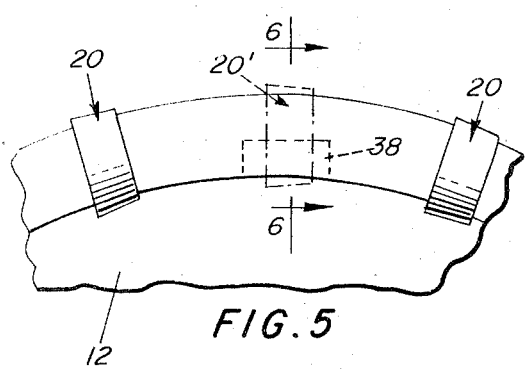
FIG. 5 is a partial top plan with a tooth removed.
Figure 6:
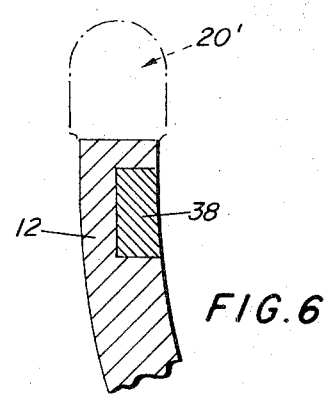
FIG. 6 is a view along the line 6—6 of FIG. 5.

In some environments of use, an objectionable squealing or high harmonic sound is emitted as the tool cuts or generates the prescriptive surfaces. This noise can be reduced by eliminating several teeth or staggering the numer of teeth about the rim to reduce harmonic vibrations. When the harmonics are thus reduced, the noise is diminished. A counter-balance such as leaded weights 38, as indicated in FIGS. 5 and 6 may be utilized. The removed tooth 20' is shown in dotted lines in FIG. 5.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

We claim:

1. An abrading tool mounted for rotary and gyratory motion for the generation of compound surfaces on an opthalmic plastic lens blank comprising, a hollow cup-shaped shell of hemispherical configuration, a shank extending from the base of said shell and having an axis of rotation, an annular rim defining the other end of said shell and having its center along an extension of said axis, a plurality of semicircular cutting teeth spaced about said rim, each of said teeth having a cutting edge, having a radially inward end and a radially outward end and, defined by a leading surface lying in generally the same plane as said axis, and a trailing surface, and said leading surface defining a positive rake angle and the radially inward end of each cutting edge lying on a first circle, and the radially outward end of each cutting edge lying on a second circle concentric with and greater in radius than that of said first circle, the difference in the radii of said circles being greater than the thickness of said shell, whereby when applied to the blank to be cut, sufficient clearance exists for said shell at any angle relative to the blank were the cutting teeth to cut through said blank.

2. The invention of claim 1 wherein said teeth are regularly spaced about said rim.

3. The invention of claim 1 wherein said teeth are irregularly spaced about said rim.

4. The invention of claim 3 wherein balancing weights are embedded in said shell to compensate for the irregular spacing.

5. The invention of claim 1 wherein said teeth are coated with a diamond plating.

6. The invention of claim 1 wherein said cutting surface is a carbide insert.

7. The invention of claim 1 wherein said teeth are steel.

8. The invention of claim 1 wherein said teeth are carbide inserts having diamond chips thereon.

* * * * *